United States Patent [19]

Ogi et al.

[11] Patent Number: 5,645,634
[45] Date of Patent: Jul. 8, 1997

[54] COMPOSITION AND METHOD FOR FORMING $Ba_{1-x}Sr_xTi_yO_3$ THIN FILMS

[75] Inventors: Katumi Ogi; Tadashi Yonezawa; Tsutomu Atsuki; Keiko Endo, all of Omiya, Japan

[73] Assignee: Mitsubishi Materials Corporation, Tokyo, Japan

[21] Appl. No.: 661,115

[22] Filed: Jun. 10, 1996

[30] Foreign Application Priority Data

| Jun. 9, 1995 | [JP] | Japan | 7-143212 |
| Jun. 12, 1995 | [JP] | Japan | 7-144537 |
| Jun. 23, 1995 | [JP] | Japan | 7-157729 |

[51] Int. Cl.⁶ ........................ C04B 35/46
[52] U.S. Cl. ............ 106/287.19; 501/137; 427/226
[58] Field of Search ............ 106/287.19; 501/137; 427/226

[56] References Cited

U.S. PATENT DOCUMENTS

| 4,886,654 | 12/1989 | Ohga et al. | 501/137 |
| 4,937,213 | 6/1990 | Bernier et al. | 501/137 |
| 5,368,834 | 11/1994 | Kulwicki et al. | 501/137 |
| 5,443,746 | 8/1995 | Harris et al. | 501/137 |

*Primary Examiner*—David Brunsman
*Attorney, Agent, or Firm*—Oblon, Spivak, McClelland, Maier & Neustadt, P.C.

[57] ABSTRACT

A composition comprising Ba and Sr salts of carboxylic acids represented by the formula: $C_nH_{2n+1}COOH$ wherein $3 \leq n \leq 7$, and having structures represented by the following formula (I):

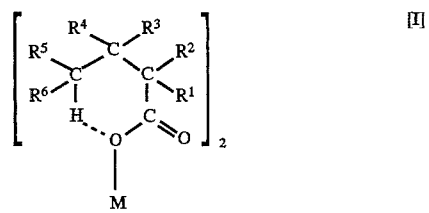

wherein $R^1$, $R^2$, $R^3$, $R^4$, $R^5$ and $R^6$ each represent a hydrogen atom, a methyl group or an ethyl group, and M represents Ba or Sr, can be used to form thin films of $Ba_{1-x}Sr_xTi_yO_3$. A composition comprising a barium carboxylate, a strontium carboxylate and a titanium alkoxide in a mixed solvent of a carboxylic acid and an ester, can also be used to form $Ba_{1-x}Sr_xTi_yO_3$ thin films. The proportion of the mixed solvent is 2-11 molar times as much as the Ti. A composition comprising salts of carboxylic acids represented by $R^aCOOH$ wherein $R^a$ is a linear or branched alkyl group having 3-7 carbon atoms, as the Ba and Sr sources, and $Ti(OR^b)_4$ wherein $R^b$ is a linear or branched alkyl group having 1-7 carbon atoms, as the Ti source, can also be used to form thin films of $Ba_{1-x}Sr_xTiO_3$.

31 Claims, No Drawings

5,645,634

COMPOSITION AND METHOD FOR FORMING $BA_{1-x}SR_xTI_yO_3$ THIN FILMS

BACKGROUND OF THE INVENTION

1. Field of the Invention

The present invention relates to a composition for forming $Ba_{1-x}Sr_xTi_yO_3$ thin films and a method for forming $Ba_{1-x}Sr_xTi_yO_3$ thin films, and more particularly to a composition and method for forming dielectric $Ba_{1-x}Sr_xTi_yO_3$ thin films which are effectively used to form thin-film condensers or capacitors.

2. Discussion of the Background

Since dielectric $Ba_{1-x}Sr_xTi_yO_3$ thin films have high dielectric constants, attention has recently been focused on their use for formation of capacitors for semiconductor memories, instead of $SiO_2$ or $SiN_x$, or built-in condensers for signal processing IC's.

Known attempted methods for formation of such thin films include CVD, sputtering, etc., drawbacks to all of which are complicated equipment and slow rates of formation of thin films. They also have the problems of leaving only small areas for forming thin films, and thus fail to provide films with large areas.

In contrast, the sol-gel method which uses a liquid raw material has advantages in that the composition can be readily controlled through the use of a variety of substituent elements or additives, and thin films with large areas can be obtained at low cost through a relatively simple process, and is therefore an industrially promising method.

The sol-gel method is a process which involves mixing metal salts or metal alkoxides as raw materials for Ba, Sr and Ti, into an organic solvent, and coating a substrate with the resulting solution, followed by crystallization. In cases where thin films are formed according to this method, since the metal salts or the metal alkoxides exhibit higher degrees of solubility in the organic solvent, after the coating solution has been coated, the films are usually dried at room temperature and 150° C., and then undergo calcination at 500°–600° C. for 1 hour, or at 750° C. or a higher temperature for 1 minute. In order to increase the film thickness, the steps of coating, drying and calcination are repeated, and finally firing at a firing temperature of 650° C. or higher is effected for crystallization.

Here, the raw materials for the coating solution can be metal alkoxides for any of Ba, Sr and Ti (M. N. Kamalasanan, et al., J. Appl. Phys. 74(9):0021–8979, 1993); or carboxylic salts of Ba and Sr, and an alkoxide of Ti (H. K. Chae, et al., Mat. Res. Soc. Symp. Proc. Vol. 271, 1992).

The recent need for increased densities and multifunctionality of electronic circuits requires three-dimensional, multi-layer wiring on substrates and simplified processes for their preparation. According to the conventional processes for forming thin films, however, recoating must be repeatedly followed by the step of calcination at a high temperature, such as 500°–600° C., and the firing temperature for crystallization is high as well. Therefore it has been difficult to meet the requirements as mentioned above, due to possible impairment of transistor devices, etc. or changes in properties which result from production of unwanted oxides.

On the other hand, since the use of a carboxylic salt as one of the raw materials allows sintering with a relatively small quantity of heat and with a low shrinkage factor which results in the advantage of resistance to cracking of the thin films formed, the following compositions for forming thin films have been proposed as well.

(i) A composition for forming barium titanate thin films, which is prepared by dissolving a barium salt of a lower-carboxylic acid (preferably, barium acetate) and titanium isopropoxide in an organic solvent which contains ethylene glycol monomethyl ether, and contacting the resulting solution with water (Japanese Unexamined Patent Application Disclosure HEI 1-100024); and (ii) a composition for forming barium titanate thin films, which is prepared by dissolving barium 2-ethylhexanoate and titanium isopropoxide in methanol as the solvent which contains acetylacetone (J. Appl. Phys. 74(9):1, November 1993).

For preparation of the conventional compositions (i) and (ii) above for forming thin films, additives such as ethylene glycol monomethyl ether, acetylacetone, etc. are added in order to increase the solubility of the carboxylate which is barely soluble in the solvent, and to improve the homogeneity of the thin films. The addition of such additives, however, causes an increase in the decomposition temperature of the resulting metal complex, and this results in the problem of an increased firing temperature.

Practical firing temperatures are all relatively high as evidenced by the firing temperature described in Japanese Unexamined Patent Application Disclosure HEI 1-100024, for example, 800°–1300°, or 750° C., the firing temperature described in J. Appl. Phys. 74(9):1, November 1993. The conventional compositions which require these high firing temperatures have presented problems; the underlying substrate is prone to degradation due to the high heat during the firing, and the electric properties of the resulting thin films, including their dielectric constants, tend to be impaired.

In addition, the following methods have been presented for the formation of thin films as well.

(iii) A method for forming $SrTiO_3$ films, which comprises drying isopropoxy strontium and isopropoxy titanium as the raw materials at 150° C., followed by a first firing at 620° C. and a second firing at 700° C. for crystallization (the symposium summary for the 1992 symposium held by The Ceramic Society of Japan, p. 4);

(iv) a method for forming $BaTiO_3$ films by crystallizing barium acetate and n-butoxy titanium as the raw materials at 700°–900° C. (J. of The Ceramic Society of Japan, 98(8):743–748, 1990); and (v) a method for forming $BaTiO_3$ films by crystallizing metal soaps of barium and titanium at 600°–1300° C. (Japanese Unexamined Patent Application Disclosure HEI 1-308801).

However, in (iii) alkoxides are used as the raw materials for Ba and Sr. $CO_2$, which is evolved during the first firing, reacts with the Ba and Sr already present, as the result of hydrolysis, to produce $BaCO_3$ and $SrCO_3$ which then react with $TiO_2$ to form $BaTiO_3$, $SrTiO_3$ or $Ba_{1-x}Sr_xTiO_3$ while releasing $CO_2$. Accordingly, the amount varies greatly due to the release of $CO_2$, resulting in increased shrinkage of the films which tends to cause cracking. Likewise, in (iv) above wherein barium acetate is used as one of the raw materials, a carbonic salt tends to be formed, and thus cracking easily occurs for the same reason as mentioned above. On the other hand, when metallic soaps of carboxylic acids having many carbon atoms are used according to (v) above, although no carbonic salts are formed during the heat decomposition, the amount varies greatly due to evaporation of the organic components, and eventually, cracking still tends to occur.

Even with a titanium alkoxide, the amount varies greatly due to evaporation and decomposition of the organic component during the firing, since the hydrolysis fails during formation of the films as the length of the carbon chain increases, thus resulting in cracking.

SUMMARY OF THE INVENTION

The present invention is aimed at solving the problems mentioned above.

It is an object of the present invention to provide a composition for forming $Ba_{1-x}Sr_xTi_yO_3$ thin films which can be recoated through calcination at a relatively low temperature for a relatively short time, and can be fired at a low temperature, and a method for forming $Ba_{1-x}Sr_xTi_yO_3$ thin films using the composition for forming $Ba_{1-x}Sr_xTi_yO_3$ thin films.

It is another object of the present invention to provide a composition for forming $Ba_{1-x}Sr_xTi_yO_3$ thin films which has excellent solubilities and stability of raw materials and allows formation of homogenous thin films with excellent electric properties without requiring additives such as ethylene glycol monomethyl ether or acetylacetone, and a method for forming $Ba_{1-x}Sr_xTi_yO_3$ thin films using the composition for forming $Ba_{1-x}Sr_xTi_yO_3$ thin films.

It is yet another object of the present invention to provide a composition for forming $Ba_{1-x}Sr_xTi_yO_3$ thin films which allows formation of crack-free, dielectric $Ba_{1-x}Sr_xTiO_3$ thin films while preventing production of a carbonic salt during heat decomposition and crystallization, to thereby prevent great variation in the amount, and a method for forming $Ba_{1-x}Sr_xTiO_3$ thin films using the composition for forming $Ba_{1-x}Sr_xTi_3$ thin films.

A composition for forming $Ba_{1-x}Sr_xTi_yO_3$ thin films according to the first embodiment of the present invention is a composition for forming $Ba_{1-x}Sr_xTi_yO_3$ thin films which is prepared by mixing an organic barium compound, an organic strontium compound and an titanium alkoxide in an organic solvent at a molar ratio of Ba:Sr:Ti=(1−x):x:y wherein 0<x<1, and 0.9≦y≦1.1, characterized in that the organic barium compound and the organic strontium compound are metal salts of carboxylic acids represented by the general formula: $C_nH_{2n+1}COOH$ wherein 3≦n≦7, and are carboxylic salts which can have structures represented by the following formula (I):

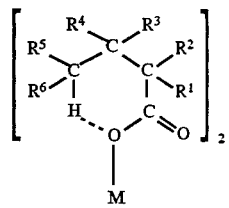

wherein $R^1$, $R^2$, $R^3$, $R^4$, $R^5$ and $R^6$ each represent a hydrogen atom, a methyl group or an ethyl group, and M represents Ba or Sr.

The method for forming $Ba_{1-x}Sr_xTi_yO_3$ thin films according to the present invention is a method for forming $Ba_{1-x}Sr_xTi_yO_3$ thin films using the composition for forming $Ba_{1-x}Sr_xTi_yO_3$ thin films, characterized by the steps of coating a substrate with the composition for forming $Ba_{1-x}Sr_xTi_yO_3$ thin films and drying the coating film at a temperature of 150°–400° C., and then firing the coating film at a temperature of 450°–800° C. for crystallization. The steps of coating and drying may be repeated to form a film of a desired thickness, followed by the firing step.

According to the first embodiment, the carboxylic salts used as the Ba raw material and the Sr raw material are easily decomposed at a low temperature as indicated by the following reaction equation:

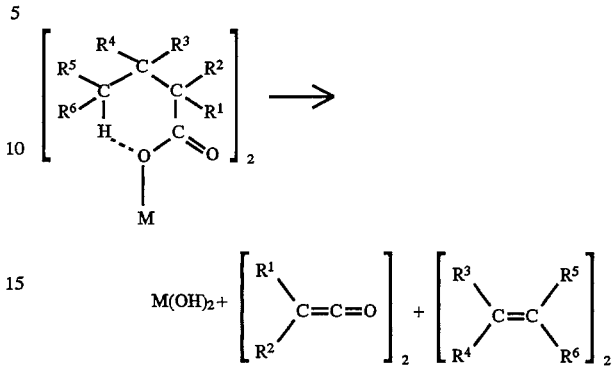

wherein $R^1$ through $R^6$ and M are the same as the above.

More specifically, having structures of six-membered rings due to the function of hydrogen bonds, the carboxylic salts undergo ideal decomposition of the carbon-to-carbon bonds at a lower temperature (Allen W. et al., Mat. Res. Sec. Symp. Proc. Vol. 271, 1992). For example, a document (M. K. Kamalasanan, et al., Apple. Phys. Lett. 59(27): 0003–6951) describes that 2-hexanoic salts can be heat-treated satisfactorily at a lower temperature for a shorter time than acetic salts.

As mentioned above, since the carboxylic salts used according to the first embodiment are easily decomposed at a low temperature, recoating for forming a coating film can be accomplished by heat treatment at a lower temperature for a shorter time, and thus the firing can be accomplished at a lower temperature.

A composition for forming $Ba_{1-x}Sr_xTi_yO_3$ thin films according to the second embodiment of the present invention is a composition for forming $Ba_{1-x}Sr_xTi_yO_3$ thin films which is prepared by mixing a barium carboxylate, a strontium carboxylate and a titanium alkoxide in an organic solvent at a molar ratio of Ba:Sr:Ti=(1−x):x:y wherein 0≦x≦1.0, and 0.9≦y≦1.1, characterized in that the organic solvent is a mixed solvent which contains a carboxylic acid and an ester, and the content of the carboxylic acid in the composition is 2–11 molar times as much as the titanium of the titanium alkoxide.

The method for forming $Ba_{1-x}Sr_xTi_yO_3$ thin films according to the present invention is characterized by coating a substrate with the composition for forming $Ba_{1-x}Sr_xTi_yO_3$ thin films, followed by drying and subsequent firing at 450°–800° C.

Increased stability of the composition for forming thin films and formation of homogenous thin films become possible through the use of a carboxylic acid according to the second embodiment, particularly the same carboxylic acid as that composing the barium carboxylate and/or strontium carboxylate in admixture with a conventional ester or alcohol, at an appropriate mixing ratio, as the organic solvent for dissolving the barium carboxylate, the strontium carboxylate and the titanium alkoxide as the raw materials for the thin films. The composition can be formed without using such stability-improving additives as required by the prior art. This in turn allows low-temperature firing for formation of the thin films, and thus satisfactory $Ba_{1-x}Sr_xTi_yO_3$ thin films can be formed without causing the problems of impairing the substrate, and damaging the electric properties, such as reducing dielectric constants.

In the first and second embodiments of the present invention, $Ba_{1-x}Sr_xTi_yO_3$ means $Ba_{1-x}Sr_xTi_y$ oxide. When $y\neq 1$, then the number of oxygen atoms in the formula may vary from 3, i.e. $Ba_{1-x}Sr_xTi_yO_z$, where $z\neq 3$. A possible value for z is $z=1+2y$.

A composition for forming $Ba_{1-x}Sr_xTi_yO_3$ thin films according to the third embodiment of the present invention is a composition for forming $Ba_{1-x}Sr_xTi_yO_3$ thin films which is prepared by mixing a barium carboxylate, a strontium carboxylate and a titanium alkoxide in an organic solvent at a molar ratio of Ba:Sr:Ti=$(1-x):x:1$ wherein $0<x<1$, characterized in that the carboxylic acids which form the carboxylic salts are one or more selected from the following group (A), and the alkoxide is one or more selected from the following group (B):

(A) $R^aCOOH$ wherein $R^a$ is a linear or branched alkyl group having 3–7 carbon atoms; and (B) $Ti(OR^b)_4$ wherein $R^b$ is a linear or branched alkyl group having 1–7 carbon atoms.

The method for forming $Ba_{1-x}Sr_xTiO_3$ thin films according to the present invention is characterized by coating a substrate with the composition for forming $Ba_{1-x}Sr_xTi_yO_3$ thin films, followed by drying, and a subsequent firing at 500°–800° C.

Since the carboxylic acids used according to the third embodiment do not produce $BaCO_3$ or $SrCO_3$, the variation in their amounts are minimized. In addition, the variation in the amount of the alkoxide used according to the present embodiment is minimized as well. The above-mentioned use of the carboxylic acids which do not produce $BaCO_3$ or $SrCO_3$, or the barium and strontium carboxylates, and the titanium alkoxide with minimized variation in the amounts prevents production of barium or strontium carbonate in the coating films and therefore marked variation in the amounts, thus lowering the stress placed on the films themselves to prevent cracking during formation of $Ba_{1-x}Sr_xTi_yO_3$ thin films.

In the above discussions of the three embodiments, with regard to film cracking, amount may mean volume.

DETAILED DESCRIPTION OF THE INVENTION

The present invention will now be explained in detail.

First, an explanation will be given regarding the composition for forming $Ba_{1-x}Sr_xTi_yO_3$ thin films according to the first embodiment of the present invention, and a method for forming $Ba_{1-x}Sr_xTi_yO_3$ thin films.

The carboxylic salts used as the Ba raw material and the Sr raw material according to the first embodiment are metal salts of carboxylic acids represented by the formula: $C_nH_{2n+1}COOH$ wherein $3\leq n\leq 7$, and can have structures represented by the formula (I) above. Concrete embodiments of the carboxylic acids include those listed in Table 1 below.

| n of $C_nH_{2n+1}COOH$ | Name of compounds |
|---|---|
| n = 3 | n-Butyric acid (the compound of the formula (I) wherein $R^1$ through $R^6$ form a six-membered hydrogen ring) |
| n = 4 | α-Methylbutyric acid (the compound of the formula (I) wherein $R^1$ is a methyl group, and $R^2$ through $R^6$ form a six-membered hydrogen ring); and Isovaleric acid (β-methylbutyric acid) (the compound of the formula (I) wherein $R^3$ is a |

—continued

| n of $C_nH_{2n+1}COOH$ | Name of compounds |
|---|---|
| | methyl group, and the other substituents form a six-membered hydrogen ring) |
| n = 5 | 2-Ethylbutyric acid (the compound of the formula (I) above wherein $R^1$ is an ethyl group, and $R^2$ through $R^6$ form a six-membered hydrogen ring); 2,2-Dimethylbutyric acid (the compound of the formula (I) above wherein $R^1$ and $R^2$ are methyl groups, and $R^3$ through $R^6$ form a six-membered hydrogen ring); 3,3-Dimethylbutyric acid (the compound of the formula (I) wherein $R^3$ and $R^4$ are methyl groups, and the other substituents form a six-membered hydrogen ring); 2,3-Dimethylbutyric acid (the compound of the formula (I) above wherein $R^1$ and $R^3$ are methyl groups, and the other substituents form a six-membered hydrogen ring); 3-Methylpentanoic acid (the compound of the formula (I) wherein $R^3$ and $R^5$ are methyl groups, and the other substituents form a six-membered hydrogen ring); and 4-Methylpentanoic acid (the compound of the formula (I) above wherein $R^5$ and $R^6$ are methyl groups, and $R^1$ through $R^4$ form a six-membered hydrogen ring) |
| n = 6 | 2-Ethylpentanoic acid (the compound of the formula (I) wherein $R^1$ is an ethyl group, $R^1$ is a methyl group, $R^5$ is a methyl group, and the other substituents form a six-membered hydrogen ring); 3-Ethylpentanoic acid (the compound of the formula (I) above wherein $R^3$ is an ethyl group, $R^5$ is a methyl group, and the other substituents form a six-membered hydrogen ring); 2,2-Dimethylpentanoic acid (the compound of the formula (I) wherein $R^1$, $R^2$ and $R^5$ are methyl groups, and the other substituents form a six-membered hydrogen ring); 3,3-Dimethylpentanoic acid (the compound of the formula (I) wherein $R^3$, $R^4$ and $R^5$ are methyl groups, and the other substituents form a six-membered hydrogen ring); and 2,3-Dimethylpentanoic acid (the compound of the formula (I) wherein $R^1$, $R^3$ and $R^5$ are methyl groups, and the other substituents form a six-membered hydrogen ring) |
| n = 7 | 2-Ethylhexanoic acid (the compound of the general formula (I) wherein $R^1$ and $R^5$ are ethyl groups, and the other substituents form a six-membered hydrogen ring); 3-Ethylhexanoic acid (the compound of the general formula (I) wherein $R^3$ and $R^5$ are ethyl groups, and the other substituents form a six-membered hydrogen ring); 2,2-Dimethylhexanoic acid (the compound of the formula (I) wherein $R^1$ and $R^2$ are methyl groups, $R^5$ is an ethyl group, and the other substituents form a six-membered hydrogen ring); and 3,3-Dimethylhexanoic acid (the compound of the general formula (I) above wherein $R^3$ and $R^4$ are methyl groups, $R^5$ is an ethyl group, and the other substituents form a six-membered hydrogen ring) |

Barium salts or strontium salts of these carboxylic acids can be easily synthesized by reacting any of the listed carboxylic acids with barium carbonate ($BaCO_3$) or strontium carbonate ($SrCO_3$).

Meanwhile, the titanium alkoxide as the Ti raw material can be any of those represented by $Ti(OR)_4$ wherein R is a linear or branched alkyl group having 2–5 carbon atoms; preferably ethoxy titanium, isopropoxy titanium, n-propoxy titanium, isobutoxy titanium, tert-butoxy titanium, n-amyloxy titanium or the like.

According to the present invention, the organic solvent for mixing these Ba raw material, Sr raw material and Ti raw material includes esters of acetic acid and an alcohol having 2–5 carbon atoms, such as ethyl acetate, n-propyl acetate, isopropyl acetate, n-butyl acetate, sec-butyl acetate, tert-butyl acetate, isobutyl acetate, n-amyl acetate, sec-amyl acetate, tert-amyl acetate, isoamyl acetate, etc.

The Ba raw material, Sr raw material and Ti raw material are mixed in any of these organic solvents at such a ratio as to provide a desired composition of $Ba_{1-x}Sr_xTi_yO_3$ and to set the concentration of $Ba_{1-x}Sr_xTi_yO_3$ to approximately 4–10% by weight. The "concentration of $Ba_{1-x}Sr_xTi_yO_3$" means the weight of $Ba_{1-x}Sr_xTi_y$ oxide which can be produced from the total amount of Ba, Sr and Ti present in the mixture, compared with the total weight of the mixture.

Here, according to the first embodiment, since barium and strontium are added as carboxylic salts having the six-membered structures which readily undergo heat decomposition, and titanium is added as an alkoxide, the titanium alkoxide may be hydrolyzed to cause striation when a substrate is coated with the composition for forming $Ba_{1-x}Sr_xTi_yO_3$ thin films. Accordingly, it is advisable to add a stabilizer such as a β-diketone, a β-keto ester, a glycol, an alcohol or a higher carboxylic acid as necessary. Specifically, it is advisable to add acetylacetone, benzoylacetone, dibenzoylmethane, ethyl 3-oxobutanoate, 2-methoxyethanol, 2-ethoxyethanol, 2-ethoxypropanol, β-butylene glycol, 2,4-amylene glycol or the same carboxylic acid as that composing the carboxylic salts of barium and strontium in an amount 0.5 to 4.0 molar times as much as the titanium alkoxide.

In order to form $Ba_{1-x}Sr_xTi_yO_3$ thin films by the method according to the present invention using the thus obtained composition for forming $Ba_{1-x}Sr_xTi_yO_3$ thin films according to the first embodiment, a substrate made of $Pt/Ti/SiO_2/Si$, $Pt/IrO/Ir/SiO_2/Si$, $Pt/TiN/SiO_2/Si$, $Pt/Ta/SiO_2/Si$, $Pt/Ir/SiO_2/Si$ or the like, or a substrate glazed by a glass-coating with alumina, aluminum nitride, zirconia or the like is subjected to the steps of coating it with the composition for forming $Ba_{1-x}Sr_xTi_yO_3$ thin films by spin coating, dip coating, spray coating or the like and drying the coating film, a plurality of time to a desired film thickness, and the coating film is then fired. Since readily decomposable raw materials are used to prepare the composition for forming $Ba_{1-x}Sr_xTi_yO_3$ thin films according to the present embodiment, the drying can be carried out at a low temperature of 150°–400° C., and the firing can also be conducted at a low temperature of 450°–800° C. as well. Here, the drying time is usually about 5–10 minutes, while the firing time is approximately 0.5–1 hour.

An explanation will now be given regarding a composition for forming $Ba_{1-x}Sr_xTi_yO_3$ thin films, and a method for forming $Ba_{1-x}Sr_xTi_yO_3$ thin films, both according to the second embodiment.

The composition for forming $Ba_{1-x}Sr_xTi_yO_3$ thin films according to the second embodiment is prepared through the use of a mixed solvent which contains a carboxylic acid and an ester, as the organic solvent for dissolving a barium carboxylate, a strontium carboxylate and a titanium alkoxide as the raw materials for the thin films. For example, the solvent can be a mixed solvent of a carboxylic acid and an ester, or a mixed solvent of a carboxylic acid, an ester and an alcohol, preferably a mixed solvent of a carboxylic acid and an ester.

The carboxylic acid which is used to prepare the mixed solvent according to the second embodiment is preferably the same carboxylic acid as composes the barium carboxylate and/or the strontium carboxylate as the raw materials for the thin films. Accordingly, the carboxylic acid is a carboxylic acid represented by the general formula: $C_nH_{2n+1}COOH$ wherein n is an integer of 3–7, preferably any of those listed in Table 1, and more preferably n-butyric acid, α-methylbutyric acid, isovaleric acid, 2-ethylbutyric acid, 2,2-dimethylbutyric acid, 3,3-dimethylbutyric acid, 2,3-dimethylbutyric acid, 3-methylpentanoic acid, 4-methylpentanoic acid, 2-ethylpentanoic acid, 3-ethylpentanoic acid, 2,2-dimethylpentanoic acid, 3,3-dimethylpentanoic acid, 2,3-dimethylpentanoic acid, 2-ethylhexanoic acid or 3-ethylhexanoic acid.

It is preferred to use ethyl acetate, propyl acetate, n-butyl acetate, sec-butyl acetate, tert-butyl acetate, isobutyl acetate, n-amyl acetate, sec-amyl acetate, tert-amyl acetate or isoamyl acetate as the ester, and it is preferred to use 1-propanol, 2-propanol, 1-butanol, 2-butanol, isobutyl alcohol, 1-pentanol, 2-pentanol, 2-methyl-2-pentanol or isoamyl alcohol as the alcohol.

According to the second embodiment, the proportion of the carboxylic acid used as the solvent is set to 2–11 molar times as much as the titanium of the titanium alkoxide as one of the raw materials for the thin films. Proportions of the carboxylic acid which are less than twice the molar amount of the titanium fail to produce the effect of satisfactorily improving the solubility and stability, and forming homogenous thin films due to the use of the carboxylic acid. On the other hand, proportions of the carboxylic acid over 11 molar times as much as the titanium result in solution viscosities which are too high to easily accomplish uniform coating.

The composition of the mixed solvent preferably is 3–40% by weight of carboxylic acid to 20–90% by weight of the ester for the mixed solvent of a carboxylic acid and an ester. It is preferable to use 3–40% by weight of a carboxylic acid, 14–60% by weight of an ester and 7–30% by weight of an alcohol for the mixed solvent of a carboxylic acid, an ester and an alcohol.

The composition for forming the $Ba_{1-x}Sr_xTi_yO_3$ thin films according to the second embodiment is prepared by dissolving a barium carboxylate, a strontium carboxylate and a titanium alkoxide as the raw materials for the thin films in such a mixed solvent as mentioned above to a total concentration of 4–10% by weight.

Here, according to the second embodiment, the titanium alkoxide available for use as one of the raw materials for the thin films includes titanium alkoxides derived from linear or branched alcohols having 2–5 carbon atoms, for example, titanium ethoxide, titanium isopropoxide, titanium butoxide and titanium amyloxide; most preferably titanium isopropoxide is used for an appropriate reaction rate.

The acyloxy group which composes the barium carboxylate and the strontium carboxylate preferably is the one represented by the formula: $C_nH_{2n+1}COO$— wherein n is an integer of 3–7.

A carbonic salt tends to be formed during the heat decomposition in cases where n is 2 or less in the above formula, whereas the amount varies greatly due to evaporation of the organic component, thus failing to form crack-free, homogenous thin films when n is 8 or greater.

Concrete embodiments of the barium carboxylate and the strontium carboxylate include the same barium and strontium carboxylates as mentioned above as the concrete embodiments of the carboxylic acid which composes the mixed solvent.

Here, the acyloxy groups of the barium carboxylate and the strontium carboxylate may be the same or different.

These barium carboxylate, strontium carboxylate and titanium alkoxide as the raw materials for the thin films are mixed into a mixed solvent, as mentioned above, so as to provide a desired composition of $Ba_{1-x}Sr_xTi_yO_3$.

In order to form $Ba_{1-x}Sr_xTi_yO_3$ thin films using the composition for forming $Ba_{1-x}Sr_xTi_yO_3$ thin films according to the second embodiment as described above, a substrate made of Si, Pt/Ti/SiO$_2$/Si, Pt/Ta/SiO$_2$/Si, Pt/SiO$_2$/Si, Ru/RuO$_2$/SiO$_2$/Si, RuO$_2$/Si, RuO$_2$/Ru/SiO$_2$/Si, Ir/IrO$_2$/Si, Pt/Ir/IrO$_2$/Si, Pt/IrO$_2$/Si or the like is coated with the composition for forming $Ba_{1-x}Sr_xTi_yO_3$ thin films by spin coating, dip coating or another coating process, and then dried and subjected to a first firing and a second firing. In cases where a desired film thickness cannot be accomplished with one coat, the steps of coating, drying and first firing are repeated a plurality of times prior to the second firing. Here, the first firing is effected at 150°–400° C., whereas the second firing is effected at 450°–800° C. for approximately 30 minutes to 2 hours.

An explanation will now be given regarding the composition for forming $Ba_{1-x}Sr_xTiO_3$ thin films according to the third embodiment of the present invention, and a method for forming $Ba_{1-x}Sr_xTiO_3$ thin films.

According to the third embodiment, a barium salt and strontium salt of a carboxylic acid represented by the formula (A):$R^aCOOH$ wherein $R^a$ is a linear or branched alkyl group having 3–7 carbon atoms are used as the Ba and Sr raw materials. Concrete embodiments of the carboxylic acid represented by the formula (A) include the following:

those with $R^a$ having 3 carbon atoms: n-butyric acid and isobutyric acid;

those with $R^a$ having 4 carbon atoms: n-valeric acid and isovaleric acid;

those with $R^a$ having 5 carbon atoms: 2-ethylbutyric acid, n-hexanoic acid, 2,2-dimethylbutyric acid, 3,3-dimethylbutyric acid and 4-methylpentanoic acid;

those with $R^a$ having 6 carbon atoms: n-heptanoic acid and 2-methylhexanoic acid; and those with $R^a$ having 7 carbon atoms: octylic acid.

According to the third embodiment, a carbonic salt tends to be formed during the heat decomposition in cases where the alkyl group $R^a$ of each of these carboxylic acids has 2 carbon atoms or fewer, whereas the amount varies greatly due to evaporation of the organic components when $R^a$ has 8 carbon atoms or more, and crack-free, thin films cannot be formed in either of these cases. Particularly, the number of carbons of $R^a$ is preferably 5–7.

Here, the carboxylic acids which compose the carboxylic salts as the Ba raw material and the Sr raw material preferably are the same in most cases, though they may be different.

The titanium alkoxide available for use as the Ti raw material is the one represented by the formula (B): $Ti(OR^b)_4$ wherein $R^b$ is a linear or branched alkyl group having 1–7 carbon atoms, and specifically includes the following: methoxy titanium, ethoxy titanium, isopropoxy titanium, n-butoxy titanium, amyloxy titanium, hexanoxy titanium and heptanoxy titanium. Of these, particularly the alkoxide having 2–5 carbon atoms in the alkyl group $R^2$, for example, ethoxy titanium, isopropoxy titanium, butoxy titanium or amyloxy titanium, are preferably used.

According to the third embodiment, the organic solvent available for use for mixing these Ba, Sr and Ti raw materials includes acetic esters such as ethyl acetate, propyl acetate, butyl acetate and isoamyl acetate, and alcohols such as ethanol, propanol, butanol and 2-methoxyethanol.

The Ba, Sr and Ti raw materials are mixed into an organic solvent as mentioned above so as to provide a desired composition of $Ba_{1-x}Sr_xTi_yO_3$ and to set the concentration of $Ba_{1-x}Sr_xTiO_3$ to approximately 5–15% by weight. In other words, the weight of $Ba_{1-x}Sr_xTiO_3$ which can be produced from all the Ba, Sr and Ti present in the mixture is 5–15%, based on the weight of the solution.

In order to form $Ba_{1-x}Sr_xTiO_3$ thin films using the composition for forming $Ba_{1-x}Sr_xTiO_3$ thin films according to the third embodiment which is obtained as described above, a substrate made of Si, Pt/Ti/SiO$_2$/Si, Pt/Ta/SiO$_2$/Si, Pt/SiO$_2$/Si, Ru/RuO$_2$/SiO$_2$/Si, RuO$_2$/Si, RuO$_2$/Ru/SiO$_2$/Si, Ir/IrO$_2$/Si, Pt/Ir/IrO$_2$/Si, Pt/IrO$_2$/Si or the like is coated with the composition for forming $Ba_{1-x}Sr_xTiO_3$ thin films by spin coating, dip coating or another coating process, and then dried and subjected to a first firing and a second firing. In cases where a desired film thickness cannot be accomplished with one coat, the steps of coating, drying and first firing are repeated a plurality of times prior to the second firing. Here, the first firing is effected at 300°–500° C., whereas the second firing is effected at 500°–800° C. for approximately 30 minutes to 2 hours.

EXAMPLES

Having generally described this invention, a further understanding can be obtained by reference to certain specific examples which are provided herein for purposes of illustration only and are not intended to be limiting unless otherwise specified.

Example 1

A 7.11 g-portion of barium 4-methylpentanoate and 2.64 g of strontium 4-methylpentanoate were dissolved in 40 g of the solvent isoamyl acetate, and 5.5 g of the additive 2,4-pentanedione was added to the resulting solution which was then refluxed with 7.89 g of isopropoxy titanium added thereto. Thereafter, 30 g of isoamyl alcohol and isoamyl acetate were added to the mixture to a total amount of 100 g to prepare a composition for forming $Ba_{0.7}Sr_{0.3}TiO_3$ thin films as a 6% by weight solution.

This solution was coated onto a Si substrate by spin coating at 500 rpm for 5 seconds and at 3,000 rpm for 30 seconds. The coating film was dried at 200° C. for 10 minutes. These steps of coating and drying were repeated three times, and the coating film was finally fired at 550° C. for 1 hour for crystallization. A crystallized $Ba_{0.7}Sr_{0.3}TiO_3$ film was formed with a film thickness on the order of 0.2 μm.

Example 2

A 7.11 g-portion of barium 2-ethylbutyrate and 2.64 g of strontium 2-ethylbutyrate were dissolved in 40 g of the solvent isoamyl acetate, and 5.5 g of the additive 2,4-pentanedione was added to the resulting solution which was then refluxed with 7.89 g of isopropoxy titanium added thereto. Thereafter, 30 g of isoamyl alcohol and isoamyl acetate were added to the mixture to a total amount of 100 g to prepare a composition for forming $Ba_{0.7}Sr_{0.3}TiO_3$ thin films as a 6% by weight solution.

This solution was subjected to the steps of coating and drying three times, and then crystallized in the same manner as in Example 1 to form a crystallized $Ba_{0.7}Sr_{0.3}TiO_3$ film with a film thickness on the order of 0.2 μm.

Comparative example 1

A 4.91 g-portion of barium acetate and 1.77 g of strontium acetate.1/2 hydrate were dissolved in 80 g of the solvent acetic acid, and the resulting solution was subjected to dehydration at 150° C., followed by addition of 5.50 g of the additive 2,4-pentanedione and subsequent addition of 7.81 g of isopropoxy titanium. The solvent acetic acid was then added to the mixture to a total amount of 100 g to thereby prepare a composition for forming $Ba_{0.7}Sr_{0.3}TiO_3$ thin films as a 6% by weight solution.

This solution was used to form a film in the same manner as in Example 1; however, the coating ended in failure, since the preceding coating film was dissolved in the step of recoating.

Comparative example 2

A 7.61 g-portion of barium n-heptanoate and 2.85 g of strontium n-heptanoate were dissolved in 70 g of the solvent isoamyl acetate, and 7.15 g of the additive 3-oxobutanoate was added to the resulting solution which was then refluxed with 7.89 g of isopropoxy titanium added thereto. Thereafter, isoamyl acetate was added to the mixture to a total amount of 100 g to prepare a composition for forming $Ba_{0.7}Sr_{0.3}TiO_3$ thin films as a 6% by weight solution.

This solution was used to form a film in the same manner as in Example 1; however, the coating ended in failure, since the preceding coating film was dissolved in the step of recoating.

As is also apparent from the results described above, with the composition for forming $Ba_{1-x}Sr_xTi_yO_3$ thin films and according to the method for forming $Ba_{1-x}Sr_xTi_yO_3$ thin films, both by the first embodiment, the temperature required in the drying step can be lower by approximately 400° C., and the temperature required in the firing step can be lower by approximately 200° C., than according to the prior art, thus allowing easy, cost-reduced formation of high-performance $Ba_{1-x}Sr_xTi_yO_3$ thin films with a variety of desired film thicknesses.

Example 3

A 10.87 g-portion of barium 2-ethylhexanoate, 4.11 g of strontium 2-ethylhexanoate and 10.52 g of titanium isopropoxide (Ti: 16.68% by weight) were dissolved in a mixed solvent of 10.57 g (twice the molar amount as the Ti) of 2-ethylhexanoic acid and 63.93 g of isoamyl acetate. The resulting solution was refluxed for 2 hours to a satisfactory degree of uniformity, and isoamyl acetate was then added to the solution to adjust the total amount to 100 g. The solution was coated onto a titanium/platinum substrate by spin coating, dried at 300° C. for 10 minutes, subjected to the steps of coating and drying repeatedly, and finally fired at 600° C. for 1 hour to form a $Ba_{0.7}Sr_{0.3}TiO_3$ thin film with a film thickness of 2,500 Å. Gold was evaporated onto this thin film as an upper electrode, and the dielectric constant was measured with an LCR meter, with the results shown in Table 2.

Example 4

Refluxing, adjustment of the amount, coating, drying and firing were conducted in the same manner as in Example 3, except that 8.14 g of barium 2-ethylhexanoate, 7.18 g of strontium 2-ethylhexanoate and 11.02 g of titanium isopropoxide were dissolved in a mixed solvent of 33.23 g (six-fold the molar amount as the Ti) of 2-ethylhexanoic acid and 40.43 g of isoamyl acetate, to form a $Ba_{0.5}Sr_{0.5}TiO_3$ thin film with a film thickness of 2,500 Å, the dielectric constant of which was also measured in the same manner as in Example 3, with the results shown in Table 2.

Example 5

A 10.87 g-portion of barium 2-ethylhexanoate, 4.11 g of strontium 2-ethylhexanoate and 10.52 g of titanium isopropoxide were dissolved in a mixed solvent of 52.86 g (ten-fold the molar amount as the Ti) of 2-ethylhexanoic acid and 61.64 g of isoamyl acetate, the resulting solution was refluxed for 2 hours, and the amount of the solution was then adjusted to a total of 140 g by addition of isoamyl acetate. This solution was used to conduct coating, drying and firing in the same manner as in Example 3, thus forming a $Ba_{0.7}Sr_{0.3}TiO_3$ thin film with a film thickness of 2,500 Å; the dielectric constant of the thin film was also measured in the same manner as in Example 3, with the results shown in Table 2.

Example 6

Refluxing, adjustment of the amount, coating, drying and firing were conducted in the same manner as in Example 3, except that 9.43 g of barium 2-ethylbutyrate, 3.50 g of strontium 2-ethylbutyrate and 10.52 g of titanium isopropoxide were dissolved in a mixed solvent of 21.29 g (five-fold the molar amount as the Ti) of 2-ethylbutyric acid and 55.26 g of isoamyl acetate, to form a $Ba_{0.7}Sr_{0.3}TiO_3$ thin film with a film thickness of 2,500 Å, the dielectric constant of which was also measured in the same manner as in Example 3, with the results shown in Table 2.

Example 7

Refluxing, adjustment of the amount, coating, drying and firing were conducted in the same manner as in Example 3, except that 7.06 g of barium 2-ethylbutyrate, 6.10 g of strontium 2-ethylbutyrate and 11.02 g of titanium isopropoxide were dissolved in a mixed solvent of 26.76 g (six-fold the molar amount as the Ti) of 2-ethylbutyric acid and 49.06 g of isoamyl acetate, to form a $Ba_{0.5}Sr_{0.5}TiO_3$ thin film with a film thickness of 2,500 Å, the dielectric constant of which was also measured in the same manner as in Example 3, with the results shown in Table 2.

Example 8

Refluxing, adjustment of the amount, coating, drying and firing were conducted in the same manner as in Example 3, except that 5.99 g of barium n-butyrate, 2.16 g of strontium n-butyrate and 7.89 g of titanium isopropoxide were dissolved in a mixed solvent of 9.69 g (four-fold the molar amount as the Ti) of n-butyric acid and 74.27 g of isoamyl acetate, to form a $Ba_{0.7}Sr_{0.3}TiO_3$ thin film with a film thickness of 2,500 Å, the dielectric constant of which was also measured in the same manner as in Example 3, with the results shown in Table 2.

Comparative example 3

Refluxing, adjustment of the amount, coating, drying and firing were conducted in the same manner as in Example 3, except that a mixed solvent of 5.29 g (equimolar amount as much as the Ti) of 2-ethylhexanoic acid and 63.93 g of isoamyl acetate was used as the mixed solvent, to form a $Ba_{0.7}Sr_{0.3}TiO_3$ thin film with a film thickness of 2,500 Å, the dielectric constant of which was also measured in the same manner as in Example 3, with the results shown in Table 2.

Comparative example 4

Refluxing and adjustment of the amount were conducted in the same manner as in Example 5, except that a mixed solvent of 63.48 g (twelve-fold the molar amount as the Ti) of 2-ethylhexanoic acid and 51.02 g of isoamyl acetate was used as the mixed solvent, to form a solution which was then used for coating in the same manner as in Example 5; however, the solution viscosity was too high to accomplish uniform coating. Coating of the solution after further diluted with isoamyl acetate ended in failure, and did not provide a clean film.

Comparative example 5

A solution prepared in the same manner as in Example 6, except that a mixed solvent of 4.26 g (equimolar amount as the Ti) of 2-ethylbutyric acid and 72.29 g of isoamyl acetate was used as the mixed solvent, was refluxed for 2 hours; a precipitate was formed, preventing the preparation of a composition for forming thin films.

Comparative example 6

A 5.46 g-portion of barium propionate, 1.93 g of strontium propionate and 7.89 g of titanium isopropoxide were dissolved in a mixed solvent of 12.22 g (six-fold the molar amount as the Ti) of propionic acid, 61.5 g of isoamyl acetate and 11.0 g of 2,4-pentanedione. The resulting solution was refluxed for 2 hours to a satisfactory degree of uniformity, and isoamyl acetate was then added to the solution to adjust the total amount to 100 g. The solution was coated onto a titanium/platinum substrate by spin coating, dried at 400° C. for 10 minutes, subjected to the steps of coating and drying repeatedly, and finally fired at 600° C. for 1 hour to form a $Ba_{0.7}Sr_{0.3}TiO_3$ thin film with a film thickness of 2,500 Å. The dielectric constant of the thin film was measured in the same manner as in Example 3, with the results shown in Table 2.

Comparative example 7

A 26.42 g-portion of a barium nonanoate solution (Ba: 10% by weight), 14.45 g of strontium nonanoate (Sr: 5% by weight) and 7.89 g of titanium isopropoxide were dissolved in a mixed solvent of 40.24 g of isoamyl acetate and 11.0 g of 2,4-pentanedione. The resulting solution was refluxed for 2 hours to a satisfactory degree of uniformity, and isoamyl acetate was then added to the solution to adjust the total amount to 100 g. When the solution was coated onto a titanium/platinum substrate by spin coating, the resulting film was not homogenous due to the high solution viscosity. Therefore, the solution was then diluted with isoamyl acetate to approximately 3% by weight to successfully form a homogenous film; however, it was impossible to form a film, since the preceding coating film was dissolved in the step of recoating.

TABLE 2

| Examples and Comparative examples | Type of acyloxy group ($C_nH_{2n+1}COO^-$) of carboxylic acid composing mixed solvent and carboxylic salt as thin-film raw material | Proportion of carboxylic acid composing mixed solvent (molar ratio to Ti) | Thin-film composition | Dielectric constant of thin film ($\epsilon$) |
|---|---|---|---|---|
| Examples | | | | |
| 3 | 2-Ethylhexanoic (n = 7) | 2 | $Ba_{0.7}Sr_{0.3}TiO_3$ | 350 |
| 4 | 2-Ethylhexanoic (n = 7) | 6 | $Ba_{0.5}Sr_{0.5}TiO_3$ | 228 |
| 5 | 2-Ethylhexanoic (n = 7) | 10 | $Ba_{0.7}Sr_{0.3}TiO_3$ | 340 |
| 6 | 2-Ethylbutyric (n = 5) | 5 | $Ba_{0.7}Sr_{0.3}TiO_3$ | 320 |
| 7 | 2-Ethylbutyric (n = 5) | 6 | $Ba_{0.5}Sr_{0.5}TiO_3$ | 218 |
| 8 | n-Butyric (n = 3) | 4 | $Ba_{0.7}Sr_{0.3}TiO_3$ | 200 |
| Comparative examples | | | | |
| 3 | 2-Ethylhexanoic (n = 7) | 1 | $Ba_{0.7}Sr_{0.3}TiO_3$ | 30 |
| 4 | 2-Ethylhexanoic (n = 7) | 12 | Impossible to provide a coat | |
| 5 | 2-Ethylbutyric (n = 5) | 1 | Impossible to prepare a uniform solution | |
| 6 | Propionic (n = 2) | 6 | $Ba_{0.7}Sr_{0.3}TiO_3$ | 19 |
| 7 | Nonanoic acid and 2,4-pentanedione used | | Impossible to accomplish homogenous coating | |

As is also apparent from the results shown above, with the composition for forming $Ba_{1-x}Sr_xTi_yO_3$ thin films and the method for forming $Ba_{1-x}Sr_xTi_yO_3$ thin films, both according to the second embodiment, homogenous $Ba_{1-x}Sr_xTi_yO_3$ thin films with excellent electric properties, such as dielectric constants, are formed. Thin films are formed which have excellent stability, uniformity and coating performance, by firing at a relatively low temperature on the order of 450°–800° C., without causing the problem of impairing the underlying substrate.

Example 9

A 5.29 g-portion of barium 2-ethylbutyrate and 4.57 g of strontium 2-ethylbutyrate were dissolved in 50 g of the solvent isoamyl acetate, and 8.18 g of isopropoxy titanium was added to the resulting solution to which was subsequently added isoamyl acetate to a total amount of 100 g to prepare a composition for forming $Ba_{0.5}Sr_{0.5}TiO_3$ thin films as a 6% by weight solution.

This solution was coated onto a Si substrate by spin coating at 500 rpm for 5 seconds and then at 2,000 rpm for 20 seconds. The coating film was then dried at 150° C. for 10 minutes, and then subjected to a first firing at 400° C. These steps of drying and first firing were repeated three times, and a second firing was then effected at 650° C. for 1 hour.

Optical microphotographic inspection (×100) of the surface of the resulting thin film confirmed the preparation of a crack-free film. In addition, the X-ray diffraction pattern shows the presence of a single perovskite phase.

Comparative example 8

A 3.68 g-portion of barium acetate and 3.09 g of strontium acetate.1/2 hydrate were dissolved in 80 g of the solvent acetic acid, and dehydration was conducted at 150° C., followed by addition of 5.77 g of acetylacetone and subsequent addition of 8.18 g of isopropoxy titanium. The solvent acetic acid was then added to adjust the total amount to 100 g to prepare a composition for forming $Ba_{0.5}Sr_{0.5}TiO_3$ thin films as a 6% by weight solution.

This solution was used to form a film in the same manner as in Example 9, and crystallization was then effected at 750° C. as the final heat treatment.

Optical microphotographic inspection (×100) of the surface of the resulting thin film confirmed the presence of a plurality of fine cracks in the resulting thin film.

Example 10

A 26.42 g-portion of a solution of barium octylate in isoamyl acetate which contained 10% by weight of Ba in terms of metal was mixed with 14.45 g of a solution of strontium octylate in isoamyl acetate which contained 5% by weight of Sr in terms of metal, and 7.89 g of isopropoxy titanium was added to the mixture. Isoamyl acetate was further added to the resulting mixture to prepare a total of 100 g of a solution, thus preparing a composition for forming $Ba_{0.7}Sr_{0.3}TiO_3$ thin films as a 6% by weight solution.

This solution was used to form a film in the same manner as in Example 9, and crystallization was then effected at 750° C. as the final heat treatment. Optical microphotographic inspection of the surface of the resulting thin film confirmed preparation of a crack-free thin film.

Comparative example 9

A 39.55 g-portion of a solution of barium undecanoate $((C_{10}H_{21}COO)_2Ba)$ in isoamyl acetate which contained 5% by weight of Ba in terms of metal was mixed with 42.05 g of a solution of strontium undecanoate $((C_{10}H_{21}COO)_2Sr)$ in isoamyl acetate which contained 3% by weight of Sr in terms of metal, and 8.27 g of isopropoxy titanium was added to the mixture. Isoamyl acetate was further added to the resulting mixture to prepare a total of 100 g of a solution, thus preparing a composition for forming $Ba_{0.5}Sr_{0.5}TiO_3$ thin films as a 6% by weight solution.

This solution was used to form a film in the same manner as in Example 9, and crystallization was then effected at 750° C. as the final heat treatment. Cracks were found in the surface of the formed thin film.

Comparative example 10

A 39.55 g-portion of a solution of barium maleate in 2-methoxyethanol which contained 5% by weight of Ba in terms of metal was mixed with 42.05 g of a solution of strontium maleate in 2-methoxyethanol which contained 3% by weight of Sr in terms of metal, and 8.27 g of isopropoxy titanium was added to the mixture. 2-Methoxyethanol was further added to the resulting mixture to prepare a total of 100 g of a solution, thus preparing a composition for forming $Ba_{0.5}Sr_{0.5}TiO_3$ thin films as a 6% by weight solution.

This solution was used to form a film in the same manner as in Example 9, and crystallization was then effected at 750° C. as the final heat treatment. Cracks were found in the surface of the formed thin film.

Comparative example 11

A 43.94 g-portion of a solution of barium adipate in 2-methoxyethanol which contained 3% by weight of Ba in terms of metal was mixed with 42.05 g of a solution of strontium adipate in 2-methoxyethanol which contained 2% by weight of Sr in terms of metal, and 8.27 g of isopropoxy titanium was added to the mixture. 2-Methoxyethanol was further added to the resulting mixture to prepare a total of 100 g of a solution, thus preparing a composition for forming $Ba_{0.5}Sr0.5TiO_3$ thin films as a 4% by weight solution.

This solution was used to form a film in the same manner as in Example 9; however, the film formed by spin coating had an increased thickness due to the high viscosity, and no interference of light was observed. The film was heat-treated at 750° C., nonetheless cracks were found in the surface due to the increased shrinkage factor.

Examples 11–15

The barium carboxylates, strontium carboxylates and titanium alkoxides listed in Table 3 were used and added to the organic solvents listed in Table 3 to prepare compositions for forming $Ba_{1-x}Sr_xTiO_3$ thin films as solutions in the concentrations and compositions listed in Table 3. The solutions were used to form films in the same manner as in Example 9, and the final heat treatment was carried out as the temperatures listed in Table 3 for crystallization. As the result, crack-free thin films were obtained in all these example.

TABLE 3

| Examples | Barium carboxylate | Strontium carboxylate | Titanium alkoxide | Comp. for forming thin films | | Final heat treatment | |
|---|---|---|---|---|---|---|---|
| | | | | Conc. (wt %) | "x" of $Ba_{1-x}Sr_xTi_yO_3$ | temp. (°C.) | Organic solvent |
| 11 | Barium butyrate | Strontium butyrate | Isopropoxy titanium | 10 | 0.5 | 650 | Isoamyl acetate |
| 12 | Barium valerate | Strontium valerate | Isopropoxy titanium | 10 | 0.5 | 650 | Isoamyl acetate |
| 13 | Barium 2-ethyl-butyrate | Strontium 2-ethyl-butyrate | Methoxy titanium | 10 | 0.5 | 600 | Isoamyl acetate |
| 14 | Barium 2-ethyl-butyrate | Strontium 2-ethyl-butyrate | Amyloxy titanium | 10 | 0.5 | 600 | Isoamyl acetate |
| 15 | Barium 2-ethyl-butyrate | Strontium 2-ethyl-butyrate | Amyloxy titanium | 10 | 0.5 | 600 | Isoamyl acetate |

As is also apparent from the above results, the composition for forming $Ba_{1-x}Sr_xTiO_3$ thin films according to the third embodiment is used in a coating method with an excellent film-forming efficiency to easily form crack-free, high-quality $Ba_{1-x}Sr_xTiO_3$ thin films.

Accordingly, these compositions for forming $Ba_{1-x}Sr_xTiO_3$ thin films are industrially very useful as coating solutions for forming condensers for IC's, capacitors or the like.

The Japanese priority documents,
HEI 7-143212, filed Jun. 9, 1995,
HEI 7-144537, filed Jun. 12, 1995, and
HEI 7-157729, filed Jun. 23, 1995, are all hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A composition comprising:
an organic barium compound, an organic strontium compound, a titanium alkoxide and an organic solvent, at a molar ratio of Ba:Sr:Ti=(1−x):x:y with 0<x<1, and 0.9≦y≦1.1,
wherein said organic barium compound and said organic strontium compound are metal salts of carboxylic acids, said carboxylic acids are the same or different, and are represented by the formula: $C_nH_{2n+1}COOH$ wherein 3≦n≦7, and said barium and strontium compounds can be represented by formula (I):

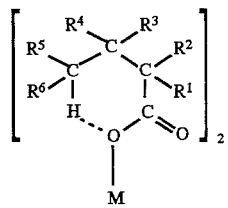

wherein $R^1$, $R^2$, $R^3$, $R^4$, $R^5$ and $R^6$ each independently represent a hydrogen atom, a methyl group or an ethyl group, and M represents Ba or Sr.

2. The composition of claim 1, wherein said carboxylic acids are selected from the group consisting of n-butyric acid, α-methylbutyric acid, isovaleric acid, 2-ethylbutyric acid, 2,2-dimethylbutyric acid, 3,3-dimethylbutyric acid, 2,3-dimethylbutyric acid, 3-methylpentanoic acid, 4-methylpentanoic acid, 2-ethylpentanoic acid, 3-ethylpentanoic acid, 2,2-dimethylpentanoic acid, 3,3-dimethylpentanoic acid, 2,3-dimethylpentanoic acid, 2-ethylhexanoic acid, 3-ethylhexanoic acid, 2,2-dimethylhexanoic acid and 3,3-dimethylhexanoic acid.

3. The composition of claim 1, wherein said carboxylic acids are selected from the group consisting of 4-methylpentanoic acid and 2-ethylbutyric acid.

4. The composition of claim 1, wherein said titanium alkoxide is represented by $Ti(OR)_4$ wherein each R is independently a linear or branched alkyl group having 2–5 carbon atoms.

5. The composition of claim 4, wherein said titanium alkoxide is selected from the group consisting of ethoxy titanium, isopropoxy titanium, n-propoxy titanium, isobutoxy titanium, tert-butoxy titanium and n-amyloxy titanium.

6. The composition of claim 1, wherein said organic solvent comprises an ester of acetic acid and an alcohol, said alcohol having 2–5 carbon atoms.

7. The composition of claim 6, wherein said ester is selected from the group consisting of ethyl acetate, n-propyl acetate, isopropyl acetate, n-butyl acetate, sec-butyl acetate, tert-butyl acetate, isobutyl acetate, n-amyl acetate, sec-amyl acetate, tert-amyl acetate and isoamyl acetate.

8. The composition of claim 1, wherein the weight of the Ba, Sr and Ti in said composition, expressed as $Ba_{1-x}Sr_xTi_yO$ oxide, is 4–10% of the weight of said composition.

9. The composition of claim 1, further comprising one member selected from the group consisting of a β-diketone, a β-keto ester, a glycol, an alcohol or a carboxylic acid as a stabilizer.

10. The composition of claim 1, further comprising one member selected from the group consisting of acetylacetone, benzoylacetone, dibenzoylmethane, ethyl 3-oxobutanoate, 2-methoxyethanol, 2-ethoxyethanol, 2-ethoxypropanol, β-butylene glycol, 2,4-amylene glycol and the same carboxylic acid as that composing the carboxylic salts of barium or strontium.

11. The composition of claim 9, comprising said one member in an amount 0.5 to 4.0 molar times as much as said titanium alkoxide.

12. A method comprising:
coating a substrate with the composition of claim 1, to form a film;

drying said film at a temperature of 150°–400° C.; and firing said film at a temperature of 450°–800° C., thereby crystallizing said film.

13. A composition comprising:

a barium carboxylate, a strontium carboxylate, a titanium alkoxide and an organic solvent at a molar ratio of Ba:Sr:Ti=(1−x):x:y with $0 \leq x \leq 1.0$, and $0.9 \leq y \leq 1.1$, wherein said organic solvent comprises a carboxylic acid and an ester; and said organic solvent comprises said carboxylic acid in an amount 2–11 molar times as much as the titanium of said titanium alkoxide.

14. The composition of claim 13, wherein said carboxylic acid is the same carboxylic acid as that composing the barium carboxylate or strontium carboxylate, and said ester is selected from the group consisting of ethyl acetate, propyl acetate, n-butyl acetate, sec-butyl acetate, tert-butyl acetate, isobutyl acetate, n-amyl acetate, sec-amyl acetate, tert-amyl acetate and isoamyl acetate.

15. The composition of claim 13, wherein said titanium alkoxide is titanium isopropoxide, and said barium carboxylate and the said strontium carboxylate are individually represented by the formula: $(C_nH_{2n+1}COO)_2M$ wherein n is an integer of 3–7 and M is Ba or Sr.

16. The composition of claim 15, wherein said carboxylic acid is selected from the group consisting of n-butyric acid, α-methylbutyric acid, isovaleric acid, 2-ethylbutyric acid, 2,2-dimethylbutyric acid, 3,3-dimethylbutyric acid, 2,3-dimethylbutyric acid, 3-methylpentanoic acid, 4-methylpentanoic acid, 2-ethylpentanoic acid, 3-ethylpentanoic acid, 2,2-dimethylpentanoic acid, 3,3-dimethylpentanoic acid, 2,3-dimethylpentanoic acid, 2-ethylhexanoic acid and 3-ethylhexanoic acid.

17. The composition of claim 13, wherein said organic solvent further comprises an alcohol.

18. The composition of claim 17, wherein said alcohol is selected from the group consisting of 1-propanol, 2-propanol, 1-butanol, 2-butanol, isobutyl alcohol, 1-pentanol, 2-pentanol, 2-methyl-2-pentanol and isoamyl alcohol.

19. The composition of claim 13, wherein said organic solvent contains 3–40% by weight of said carboxylic acid and 20–90% by weight of said ester.

20. The composition of claim 17, wherein said organic solvent comprises 3–40% by weight of said carboxylic acid, 14–60% by weight of said ester and 7–30% by weight of said alcohol.

21. The composition of claim 13, wherein said barium carboxylate, strontium carboxylate and titanium alkoxide in total comprise 4–10% by weight of said composition.

22. A method comprising:

coating a substrate with the composition of claim 13 thereby forming a film;

drying said film; and firing said film at 450°–800° C.

23. A composition comprising:

a barium carboxylate, a strontium carboxylate, a titanium alkoxide and an organic solvent at a molar ratio of Ba:Sr:Ti=(1−x):x:1 with $0<x<1$;

wherein said barium carboxylate and strontium carboxylate are formed from at least one carboxylic acid of the formula $R^aCOOH$;

said titanium alkoxide has the formula $Ti(OR^b)_4$;

$R^a$ is a linear or branched alkyl group having 3–7 carbon atoms; and each $R^b$ is independently a linear or branched alkyl group having 1–7 carbon atoms.

24. The composition of claim 23, wherein said at least one carboxylic acid is selected from the group consisting of n-butyric acid, isobutyric acid, n-valeric acid, isovaleric acid, 2-ethylbutyric acid, n-hexanoic acid, 2,2-dimethylbutyric acid, 3,3-dimethylbutyric acid, 4-methylpentanoic acid, n-heptanoic acid, 2-methylhexanoic acid, and octylic acid.

25. The composition of claim 23, wherein $R^a$ is a linear or branched alkyl group having 5–7 carbon atoms.

26. The composition of claim 23, wherein each $R^b$ is independently a linear or branched alkyl group having 2–5 carbon atoms.

27. The composition of claim 26, wherein said titanium alkoxide is selected from the group consisting of ethoxy titanium, isopropoxy titanium, butoxy titanium and amyloxy titanium.

28. The composition of claim 23, wherein said organic solvent comprises an ester of acetic acid or an alcohol.

29. The composition of claim 28, wherein said organic solvent comprises one or more members selected from the group consisting of ethyl acetate, propyl acetate, isoamyl acetate, ethanol, propanol, butanol and 2-methoxyethanol.

30. The composition of claim 23, wherein the weight of Ba, Sr and Ti in said composition, expressed as $Ba_{1−x}Sr_xTiO_3$, is 5–15% by weight of said composition.

31. A method comprising:

coating a substrate with the composition of claim 23, thereby forming a film;

drying said film; and firing said film at 500°–800° C.

* * * * *